United States Patent
Puranik et al.

(10) Patent No.: US 8,068,609 B2
(45) Date of Patent: *Nov. 29, 2011

(54) METHOD AND SYSTEM FOR SECURED WIRELESS DATA TRANSMISSION TO AND FROM A REMOTE DEVICE

(75) Inventors: Gagan Puranik, Madison, MS (US); Laymon Scott Humphries, Clinton, MS (US)

(73) Assignee: Verizon Business Global LLC, Basking Ridge, NJ (US)

( * ) Notice: Subject to any disclaimer, the term of this patent is extended or adjusted under 35 U.S.C. 154(b) by 355 days.

This patent is subject to a terminal disclaimer.

(21) Appl. No.: 12/347,650

(22) Filed: Dec. 31, 2008

(65) Prior Publication Data

US 2009/0220086 A1    Sep. 3, 2009

Related U.S. Application Data

(63) Continuation of application No. 10/758,199, filed on Jan. 16, 2004, now Pat. No. 7,577,836.

(51) Int. Cl.
*H04L 9/00* (2006.01)

(52) U.S. Cl. .......... 380/270; 380/30; 713/162; 713/170; 370/338

(58) Field of Classification Search .............. 380/30, 380/270; 713/162, 170; 370/338
See application file for complete search history.

(56) References Cited

U.S. PATENT DOCUMENTS

| | | |
|---|---|---|
| 5,740,534 A | 4/1998 | Ayerst et al. |
| 5,937,344 A | 8/1999 | Zicker |
| 6,078,572 A | 6/2000 | Tanno et al. |
| 6,125,276 A | 9/2000 | Lupien |
| 6,259,911 B1 | 7/2001 | Bims et al. |
| 6,295,492 B1 | 9/2001 | Lang et al. |
| 6,330,447 B1 | 12/2001 | Hengeveld |
| 6,477,159 B1 | 11/2002 | Yahagi |
| 6,510,145 B1 | 1/2003 | Kim et al. |
| 6,611,740 B2 | 8/2003 | Lowrey et al. |
| 6,636,790 B1 | 10/2003 | Lightner et al. |
| 6,732,031 B1 | 5/2004 | Lightner et al. |
| 6,754,583 B2 | 6/2004 | Verbil |
| 7,024,557 B1 | 4/2006 | Moles et al. |
| 7,193,985 B1 * | 3/2007 | Lewis et al. ............ 370/338 |
| 2002/0173885 A1 | 11/2002 | Lowrey et al. |
| 2005/0156708 A1 | 7/2005 | Puranik et al. |
| 2006/0018293 A1 | 1/2006 | Farley et al. |

* cited by examiner

*Primary Examiner* — Thanhnga Truong

(57) ABSTRACT

The device tracking location adherence and route adherence technology, according to an exemplary embodiment of this invention, at least provides for secure message reception from a remote device. The present invention allows for secure data transmission between a remote device and while employing a small amount of bandwidth thereby providing a cost-effective data transmission system. This is especially advantageous where a fleet of remote devices is employed within a network.

20 Claims, 12 Drawing Sheets

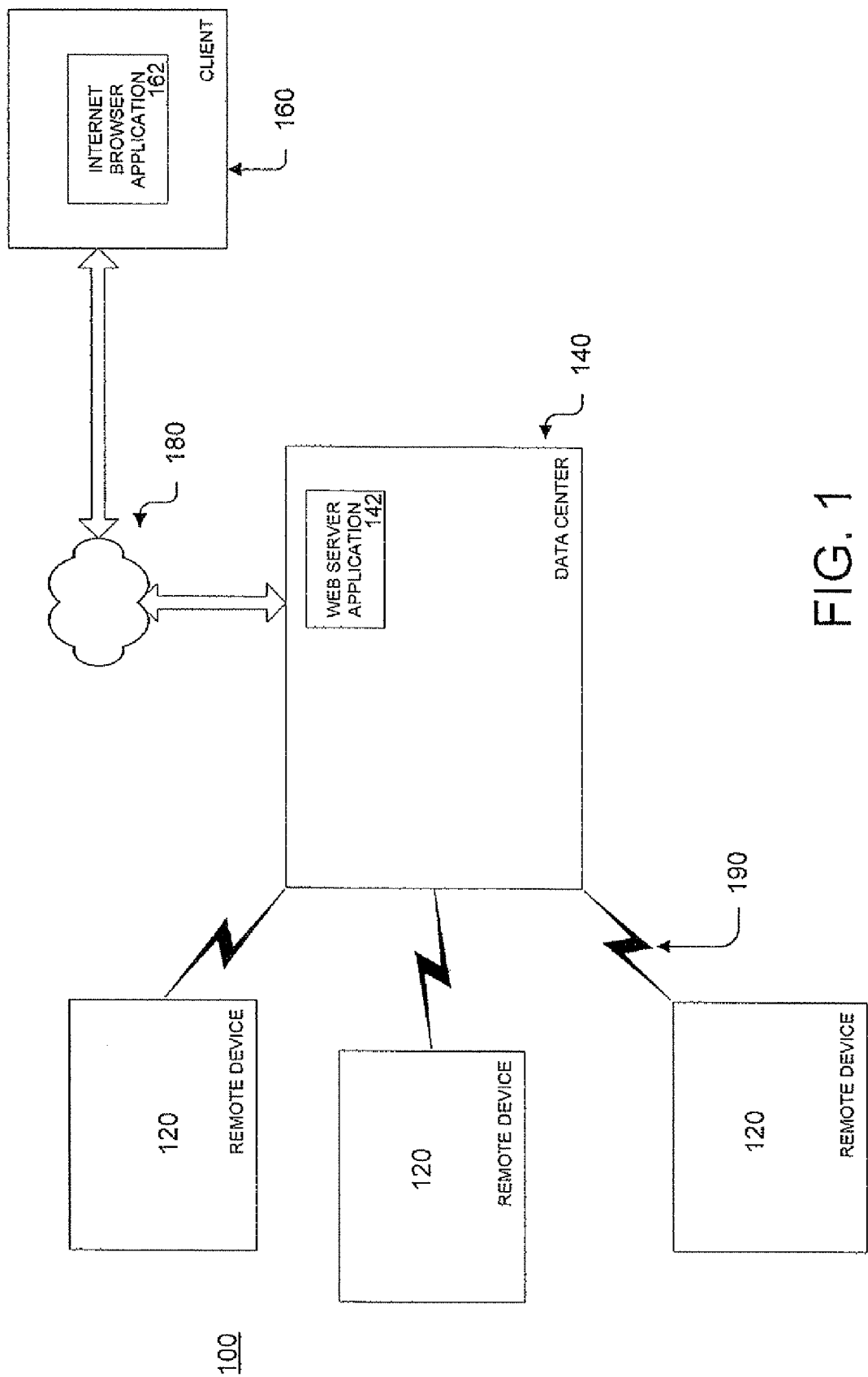

| HEADER | COMMAND TYPE | MESSAGE AUTHENTICATION |

| HEADER | COMMAND TYPE | KEY INDEX | SERVER IV | DEVICE IV | MESSAGE AUTHENTICATION |

| HEADER | KEY INDEX | IV OFFSET | ENCRYPTED PAYLOAD |

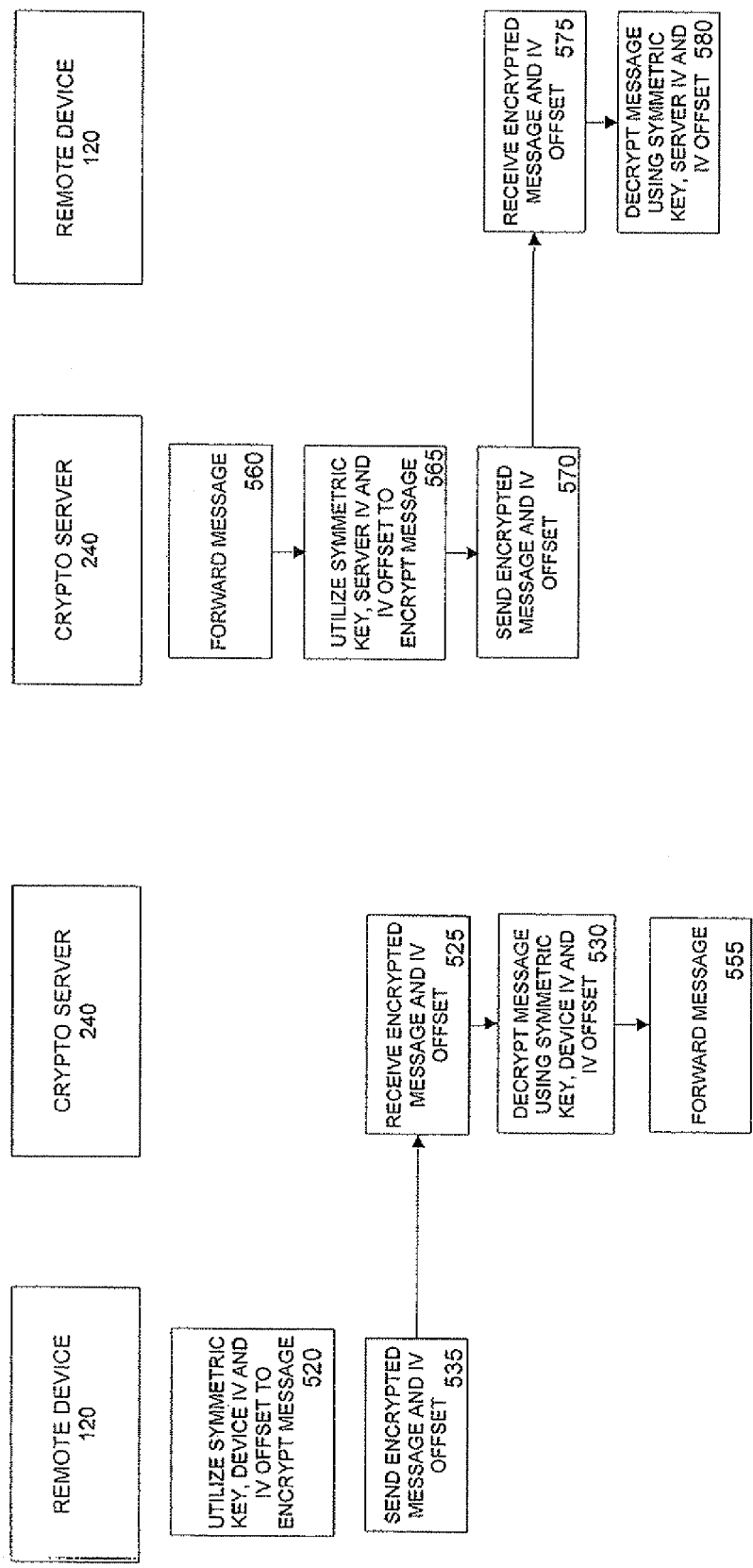

METHOD AND SYSTEM FOR SECURED WIRELESS DATA TRANSMISSION TO AND FROM A REMOTE DEVICE

RELATED APPLICATION

This application is a continuation of U.S. patent application Ser. No. 10/758,199 filed Jan. 16, 2004, the entire disclosure of which is incorporated herein by reference.

BACKGROUND

1. Field of the Invention

The present invention generally relates to secured data transmission to and from a remote device, and more specifically to a method and apparatus for secure key establishment and data encryption that enables the secured wireless data transmission to and from a remote device.

2. Discussion of the Background

Efficient wireless communication between remote objects has been a long term goal of many different areas of industry. With the increased processing capabilities of today's computer processors as well as the continued advancement within the communications industry, one would assume that wireless communications between remote devices would have become quite pedestrian in nature. To the contrary, accompanying the swift advancement of the above-described technologies is the reality that some basic goals within the wireless communication industry have yet to be achieved.

For example, one aspect of remote device communication that continues to need refinement is data security and the manner in which secured data is transmitted to and from remote devices. Specifically, since a remote device normally uses a wireless transmission medium, the ability to transmit and receive data securely can be hampered by many factors such as weather and positioning of the remote device. This, in turn, reduces the reliability and security of messages sent from and received at the remote device.

Additionally, since narrow bandwidth transmission channels are used to transmit data over the air to a base location, remote devices are currently unable to efficiently support the encryption techniques usually employed with larger bandwidth transmission mediums. For example, when the Internet is accessed via a wired transmission medium, a web page can be retrieved using TCP/IP protocols. Using these or similar protocols, private accounts can be accessed on-line, once a security handshake is performed to ensure a secure link. To ensure that a secure link exists between two parties, certificates are exchanged and validated. However, with regard to wireless transmission mediums incorporating the aforementioned narrow-band communications protocols employed, this type of encryption and security is not efficient.

One possible solution to the above noted problems would be to modify an existing narrowband protocol in order to utilize a transmission protocol between the remote device and the base that could handle some of the bandwidth requirements of the security algorithms currently available. This solution, however, would be especially problematic for fleet management businesses. Most fleet management businesses would like to track hundreds (or more) of remote devices at the same time. Unfortunately, the amount of network resources and associated hardware that is required to support a fleet of remote devices employing large amounts of bandwidth is not economically feasible. The associated costs to build and maintain such a network is prohibitive.

Additionally, upon power-up, remote devices do not include any of the necessary security keys required to encrypt data. The keys are obtained by performing a key establishment routine after the initial power-up routine is complete. With most remote devices that employ encryption techniques, the security keys are established "out-of-band" (e.g., through the use of an external input or code). However, when remote devices are used that do not include a user interface, the establishment of security keys out-of-band is not plausible, since there is no user to receive and process the out-of-band information. Thus, when such remote devices employed there is currently one available option when establishing security keys: install the security keys in the remote device at the factory prior to powering the remote device. This option however is less than desirable as security is jeopardized by having a third party install security keys.

SUMMARY

Therefore, there is a need for methods and systems that provides a key establishment routine that can be performed without any user input or manipulation at the remote device and provide secure and economical transmission of messages from numerous remote devices.

In accordance with one exemplary embodiment of the present invention, a method and an apparatus for secure method reception from a remote device is provided which comprises receiving a message, obtaining a reverse channel address associated with the received message, ensuring that the received message is associated with at least one of the remote devices, determining the destination address for the received message by obtaining a reverse channel address associated with the received message; and routing the message to the destination address.

In accordance with another exemplary embodiment of the present invention, a method and associated apparatus is provided for establishing encryption keys with a data center from a remote wireless device, by automatically sending a first registration message to the data center, receiving, in response to the first registration message, an acknowledgment signal and, sending a second registration message to the data center, wherein the second registration message includes a command to start encryption key establishment.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 1 is a functional block diagram providing an exemplary device tracking system in accordance with the present invention;

FIGS. 4C and 4D provide exemplary message formats in accordance with an exemplary embodiment of the present invention;

FIGS. 5A and 5B illustrate a flow diagrams generally describing the secure message transmission in accordance with an exemplary embodiment of the present invention;

FIG. 5C depicts an exemplary message format for an encrypted message sent between the remote device and the data center;

DETAILED DESCRIPTION

Figure 2A:
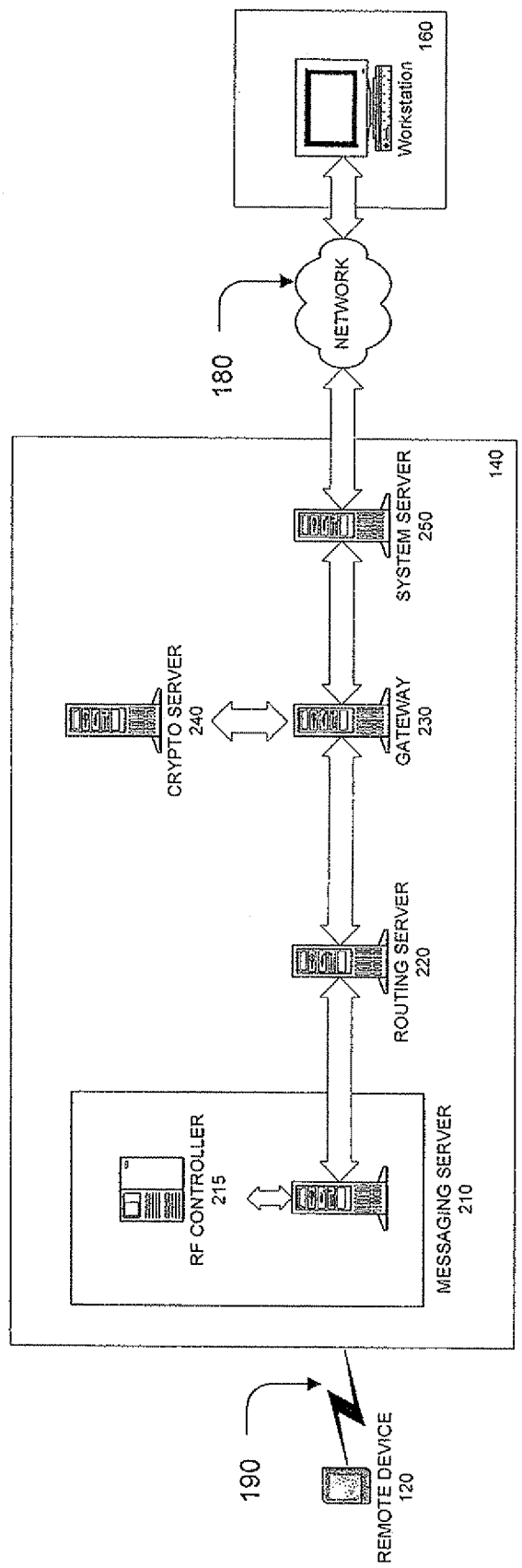
FIGS. 2A and 2B are exemplary hardware implementations of the device tracking system of FIG. 1 in accordance with the present invention.

Exemplary embodiments of the present invention relate to secure data transmission from a remote device utilizing a small amount of available bandwidth. Although specific embodiments will be illustrated and described herein, it should be appreciated by those of ordinary skill in the art that any arrangement, which is calculated to achieve the same purpose, may be substituted for the specific embodiment shown herein. This application is intended to cover any adaptations or variations of the present invention that generally relate to systems, methods and an apparatuses regarding secure data transmission and remote key establishment.

In the following detailed description of the exemplary embodiments, reference is made to the accompanying drawings that form part hereof, and in which is shown by way of illustration, specific exemplary embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit and scope of the present invention. The following detail description is therefore not to be taken in a limiting sense.

FIG. 1 depicts a remote device communication system 100 and related components in accordance with the present invention. In particular, the device tracking system 100 comprises remote devices 120, a data center 140, and a client 160. The remote devices 120 are connected to the data center 140, via links 190. The client 160 is also connected to the data center 140 via link 180.

It should be appreciated that the link 180, connecting the data center 140 to the client 160, can be wired or wireless links or any combination thereof, or any other known or later developed element(s) that is capable of supplying and/or communicating data to and from the connected elements.

It should also be appreciated that, in accordance with the present invention link 190 supporting communication between remote devices 120 and the data center 140 is wireless. The link 190 can support protocols (e.g., ReFLEX™ protocol) and systems associated with a wireless local area network (LAN) as well as a wireless data network, wireless packet switching, wireless local loop or any other known or later developed wireless element(s) that is capable of supplying and/or communicating data to and from the connected elements.

In accordance with exemplary embodiment of the present invention, the ReFLEX™ protocol is employed to effect communications between remote device 120 and the data center 140. The ReFLEX™ protocol is a two way messaging protocol used for short alphanumeric paging that employs cellular-like frequency reuse to expand capacity. The ReFLEX™ protocol, generally, is implemented in 900 MHz Narrowband PCS band.

The protocol defines the manner in which message and control data is sent to the paging and messaging receiver as well as the manner used to return the various types of responses from the receiver. ReFLEX™ supports framed forward (communication from the network to the remote device) and reverse channels (communication from the remote device to the network).

Additionally, it should be appreciated that while various components are illustrated in FIG. 1 and that various other components, such as switches, routers, long distance carriers, firewalls, security components and/or software, or the like (discussed in further detail below in exemplary embodiments of the invention), can also be included without affecting the operation of the system.

The client 160 can be a user located at a workstation comprising a computer (discussed with regard to FIG. 8) that includes, for example, an Internet browser application 162 providing a user with the ability to remotely access data and applications located at the data center 140. The Internet browser application 162 (e.g., HTTP-based, HTTPS-based, etc.) transfers files and data via the web server application 142 in the data center 140. The user can then access various applications at the data center as well as data associated with the remote device 120. It should also be understood that the client 160 can include multiple individual users located on individual workstations. Additionally, is should be understood that additional clients could also be set up to access the applications provided by the data center 140.

The data center 140 can include a web server application 142, as well as other types of data processing applications. The web server application 142 can include any suitable web server programming that enables access and data exchange with client 160. For example, the web server application 142 can supply a mapping application (not illustrated) that can be used for tracking a remote device 120, in the form of an applet, plug-in, or the like for viewing and/or interaction by a user at client 160.

The remote device 120 can be implemented using one or more general purpose computer systems, microprocessors, digital signal processors, micro-controllers, etc., programmed according to the teachings of the embodiments of the present invention (e.g., using the hardware system of FIG. 7) Appropriate software can be readily prepared by programmers of ordinary skill based on the teachings of the present disclosure, as will be appreciated by those skilled in the software art.

FIG. 2A depicts a network, in accordance with an exemplary embodiment of the present invention, that provides secure data transmission in which a crypto server 240 is hosted within the data center 140. The data center 140 includes a messaging server 210 that includes an RF controller 215, a routing server 220, a gateway 230, the crypto server 240 and a system server 250.

The messaging server 210 is responsible for receiving airborne messages from and sending airborne messages to the remote device 120, via link 190. The messaging server also includes the RF controller 215 that is able to determine that a received message is received from a proper remote device with permission to access the network. A proper remote device in accordance with an exemplary embodiment of the present invention includes tracked devices that do not include the ability for a user to interact with the data center. The RF controller 215 has access to a database that includes a device profile which further includes information associated with remote devices granted access to the network as well as destination address information with regard to each remote device 120 in the network. Thus, once this information is associated with a received message the secured message is sent from the messaging server 210 to routing server 230.

All messages received by remote devices on the network are forwarded from the messaging server 210 to the routing server 220. The routing server 220 is able to access the device profile that includes destination address that has been configured for the specific remote device 120 and forwards the message to the destination via the gateway 230. The gateway 230 represents a conduit through which the message is routed to the crypto server 240.

The crypto server 240 provides the necessary key exchange and encryption services for messages sent from the remote devices 120. The system server 250 provides the fleet tracking, asset tracking and general purpose monitoring and control for use with regard to the remote devices.

The system can also include an A-GPS server. The A-GPS server is able to determine assistance data that is broadcast to the remote devices. This server collects information to be utilized by the server to generate the assistance data. Thus, if this server is employed, some of the messages received at the messaging server can routed to the A-GPS server.

Figure 2B:
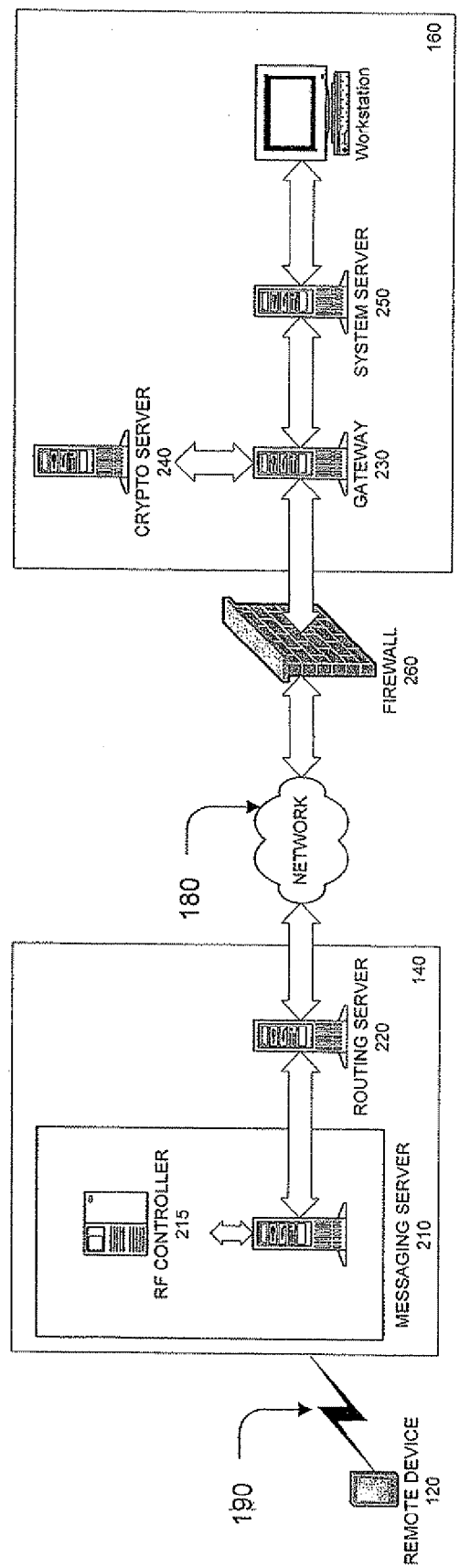

FIG. 2B depicts a network, in accordance with another exemplary embodiment of the present invention, that provides secure data transmission in which the crypto server 240 is located at the client 160 (i.e., an crypto server that is located at an enterprise location). Specifically, the data center 140 includes the messaging server 210, the RF controller 215 and the routing server 220 while the client 160 comprises the gateway 230, the crypto server 240 and the system server 250, which can include a firewall 260 placed between the client 160 and the data center 140.

In yet another variation, the system server 250 can, in addition to supplying necessary information concerning the remote device 120, via link 180 to a single workstation, can also supply this information to an enterprise server (not illustrated), located at the client. The enterprise server, in turn, could supply this information to a plurality of additional workstations.

Figure 3:
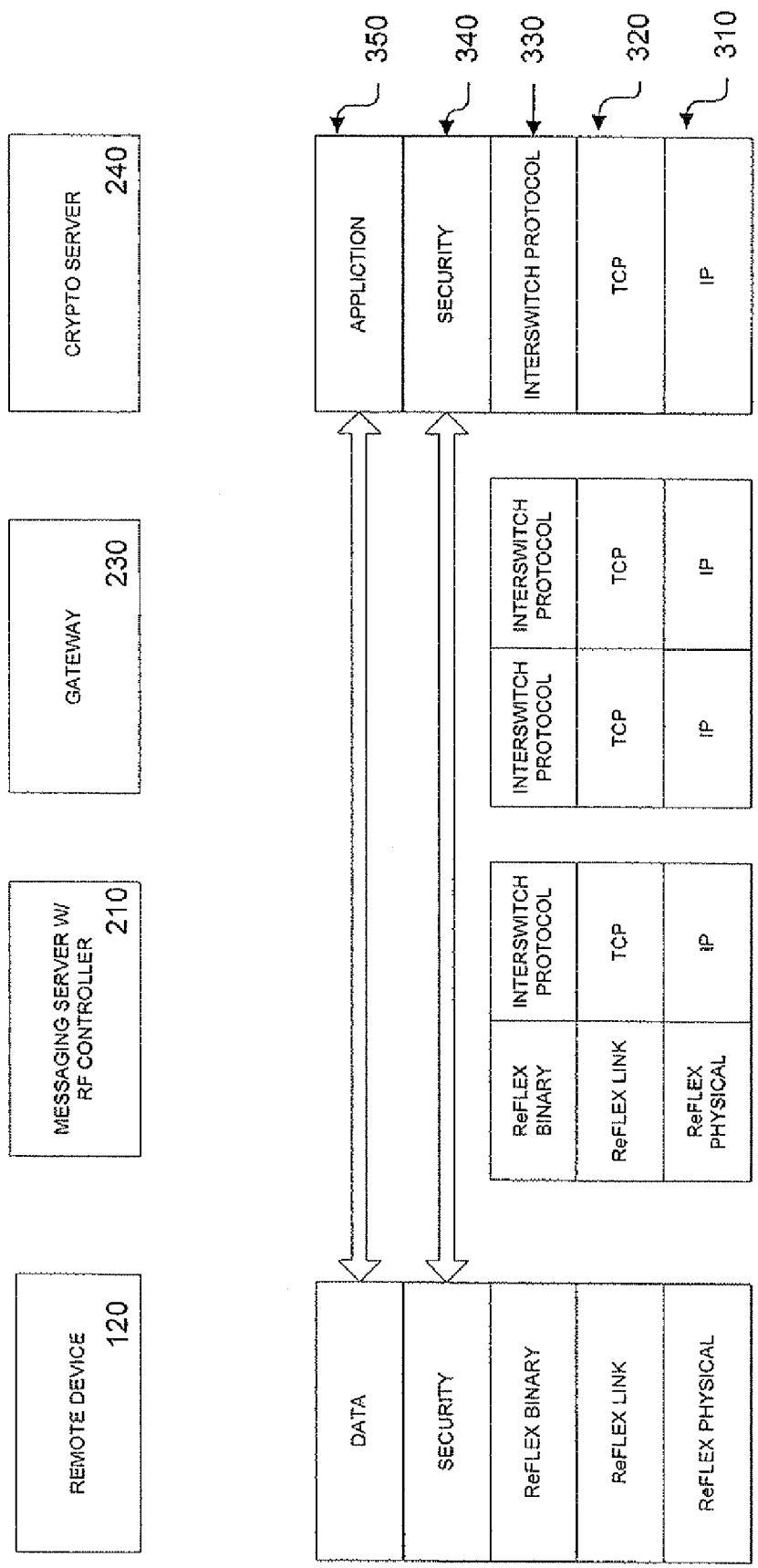
FIG. 3 presents a graphical illustration of the networking protocols employed in accordance with an exemplary embodiment of the present invention.

To achieve the sufficient encryption security for data sent between the remote device 120 and the crypo server 240, the remote device of present invention sends all confidential data over the existing ReFLEX™ protocol. To provide a background with regard to protocols that can be employed with the present invention, FIG. 3 is provided. FIG. 3 is a block diagram that graphically illustrates a model 300 for networking protocols employed, in accordance with an exemplary embodiment of the present invention, to achieve a higher degree of network security than provided by current over-the-air data transmission systems.

Layer 310 depicts the protocols employed for use in the physical layer from the remote device 120 through the messaging server 210 and gateway 230 to the crypto server 240. In accordance with the present invention, the ReFLEX™ physical protocol is employed when a message is transmitted from the remote device to the messaging server and an Inter-network Protocol (IP) is employed with the servers in the data center 140. Layer 320 depicts the protocols employed for use in the transport layer from the remote device 120 through the messaging server 210 and gateway 230 to the crypto server 240. In accordance with the present invention, the ReFLEX™ Link protocol is employed when a message is transmitted from the remote device to the messaging server and transmission control protocol (TCP) is employed with the servers in the data center 140.

Layer 330 depicts the protocols employed for use in the data link layer from the remote device 120 through the messaging server 210 and gateway 230 to the crypto server 240. In accordance with the present invention the ReFLEX™ Binary protocol is employed when a message is transmitted from the remote device to the messaging server and inter-switch protocol is employed with the servers in the data center 140. The data link layer provides communication channel (i.e., the reverse channel) by which, the identification of the remote device is provided to the data center 140. In accordance with the present invention, by providing only the identification of the remote device, no security sensitive information is laid open for hackers.

Layer 340 represents the security layer and layer 350 represents the data layer. The data associated with these layers, in accordance with the present invention and as will be explained in more detail below, is secured in an end-to-end fashion between the remote device 120 and the crypto server 240.

As discussed above, by providing the identification of remote device 120 in the reverse channel in the data link layer 330, messages can be transmitted through the network without exposing critical server information such as a message's destination address. The ability of the data center 140 ability to use the identification of the remote device 120 to itself determine the destination address for the message provides a high level of security while employing a narrowband protocol such as ReFLEX™. As a result, a system is inexpensively provided in which outside individuals (e.g., hackers) are unable to access or determine the data being sent between the crypto server and the remote device.

Figure 4A:
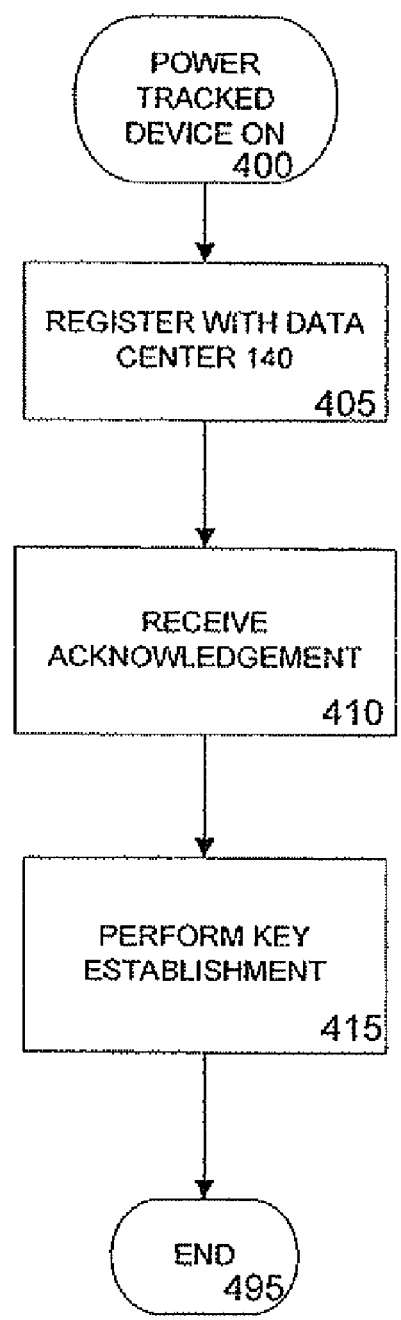
FIGS. 4A and 4B illustrate an exemplary flow diagrams describing initialization of the remote device in accordance with an exemplary embodiment of the present invention.

When the remote device 120 is manufactured and provided to a customer or user, in order to ensure that security is not breached, no security keys are programmed in the device. Thus, in accordance with another exemplary embodiment of the present invention, as generally illustrated by the flow diagram of FIG. 4A, the security keys used to encrypt and decrypt data are established in-band and over the air, via link 190. In step 400 the device is powered on. Next, in step 405, once the remote device 120 has been powered up, it will register with data center 140 using a registration process in accordance with the ReFLEX™ protocol. Assuming normal registration occurs, RF controller 215, located in the messaging server, checks the database for the identified remote device and sends an acknowledge message to the remote device 120 indicating that the remote device 120 has permission to reside on and communicate via the system 100. In step 410, the acknowledge message is received and the remote device 120, without any encryption keys, performs key establishment in step 415. Once key establishment is performed, the initialization process for the remote device has ended, as in step 495, and it is ready to transmit and receive encrypted messages.

Figure 4B:
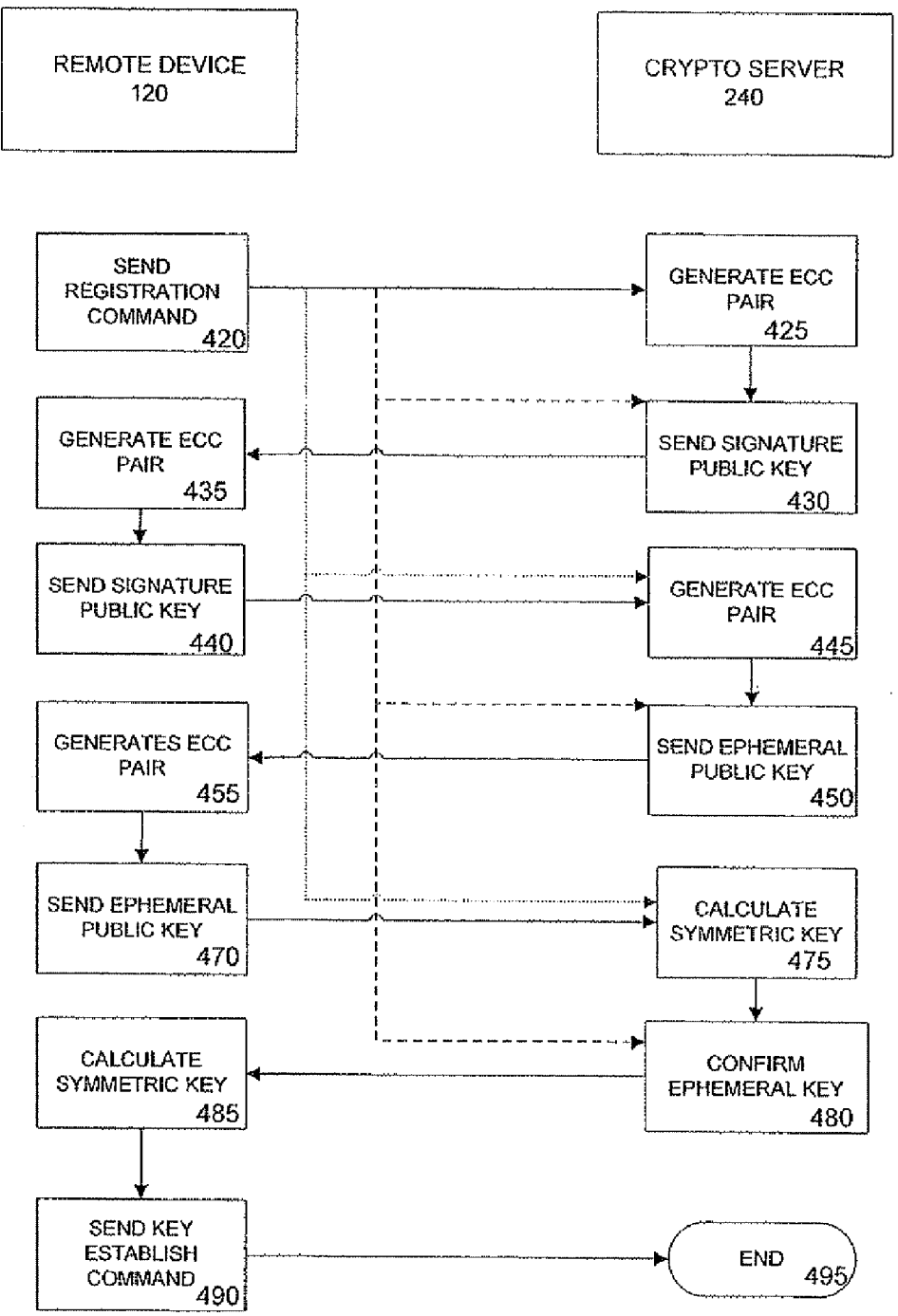

The key establishment process for the remote device 120 is described in more detail in the flow diagram of FIG. 4B. This process renders the remote device unusable for an amount of time (i.e., a few minutes). Thus, this registration process only occurs when the unit is first turned on or where there is a loss of data or an error that requires the remote device to be reset.

Referring to FIG. 4B, After successful reception of acknowledge message, the remote device 120 will send a registration message, in step 420, that includes a command to the crypto-server to start encryption key establishment. The registration message sent from the remote device 120 is depicted in more detail in FIG. 4C. The registration message 422 is made up of a header including, for example, a UAR SIF and an identification of the type of encryption algorithm to be employed. The registration message 422 also includes a command and message authentication data (i.e., data integrity).

In accordance with an exemplary embodiment of the present invention, the registration message is able to be sent at any time during key establishment. The registration command can be sent by the remote device 120 as a reminder to the crypto server 240 to provide various expected responses. For example, if the crypto server 240 has not provided the ephemeral public key, in step 450, or has confirmed the ephemeral key, in step 480 (discussed in more detail below), the registration message can be sent that includes a send command requesting that this data be sent to the remote device (as shown by the small hashed line in FIG. 4B). On the other hand, the registration message including a wait command can also be sent from the remote device 120, if the crypto server 240 has provided a signature public key in step 430, an ephemeral key in step 450 or a confirmation of the ephemeral key in step 480, and is awaiting the remote device's response (as shown by the large hashed lines in FIG. 4B). The registration message, in this case, can be provided to the crypto server 240 in order to prevent the re-sending of information already received by the remote device 120.

Turning back to FIG. 4B, the crypto server 240 in response will generate an ECC pair in step 425 and send the signature public key to the remote device in step 430. Additionally, the system of the present invention employs a public/private elliptic curve cryptography (ECC) key encryption system using AES. Over-the-air key exchange with the remote device is performed in compliance with Paging Technical Committee (PTC) RFC 41 hereby incorporated by reference in its entirety. RFC 41 document implements in FLEXsuite, the Station-to-Station protocol provided in American National Standards Institute (ANSI) X9.63, also incorporated herein by reference in its entirety.

The remote device, upon receipt of the signature public key generates an ECC pair in step 435 and sends a signature public key back to the crypto server in step 440. The crypto server 240 in response to receiving the public key generate an ECC pair in step 445 and send an ephemeral public key to the remote device in step 450. The remote device, upon receipt of the ephemeral public key generates an ECC pair in step 455 and sends an ephemeral public key back to the crypto server in step 470. The crypto server 240 in response will calculate a symmetric key in step 475 and confirms the ephemeral key with the remote device 120 in step 480.

In accordance with another exemplary embodiment of the present invention, the crypto server 240 creates initialization vectors (one each for the crypto server 240 and the remote device 120) and sends it, in clear text, to the remote device 120 in the ephemeral confirm message in step 480. Generally, in encryption, a non-secret binary vector is used as an initializing input algorithm for the encryption to increase security by introducing additional cryptographic variance. This non-secret vector is called initialization vector (IV).

By supplying the IVs in the ephemeral confirm message, IVs are efficiently established between the crypto server 240 and the remote device 120, and security is increased. In FIG. 4D, an exemplary ephemeral confirm message 482 is depicted. The ephemeral confirm message 482 includes a header, a command type, a key index, a server IV, a device IV and message authentication. The header includes, for example, a UAR SIF and an identification of the type of encryption algorithm to be employed. The key index is merely an integer that identifies the current encryption key employed by the system. When a new key is generated for any reason, the key index is incremented by one and provides a simple way to identify what encryption key is currently being employed by the system, as opposed to sending the full IVs with every message.

The IVs can be changed every time the a key is changed within the system. The remote device 120 employs device IV, for all messages encrypted. Similarly, the crypto server 240 uses server IVs for all messages encrypted by server. Accordingly, both device and server need to know each others IV. In addition to IVs, the crypto server 240 and the remote device can employ an IV offset per message to further increase the security of the message. Rather than generating IVs for every message transmission, an IV offset is employed to reduce the amount of data sent with each message. The IV offset, in accordance with the present invention, starts at 1 and increments with each message sent up to 65535 (at which time it starts over at 1) and represents the difference between the number representing the device IV and the number representing the server IV.

In response to the confirm ephemeral key command in step 480, the remote device calculates the symmetric key in step 485 then sends the key establish command to the crypto server indicating that the encryption keys have been established in step 490 and the process is ended in step 495.

The selected method of key initiation and exchange is extremely secure and provides other benefits as well. Utilizing public key cryptography techniques a shared secret proves the authenticity of the public keys being transferred. It also indicates that the messages have not been altered in transit, which is important in preventing "man-in-the-middle" attacks (i.e., attacks where the message is intercepted by an improper recipient). All of this ensures that the final agreed upon symmetric key is secure between the crypto server and the remote device.

Also, a device specific shared secret can be loaded into the remote device prior shipping to the end user. This shared secret can be any random number however, in accordance with the present invention and for ease of tracking/administration it is recommended that this value be the device serial number. When the remote device is reset to factory fresh conditions, the internal software can be designed to automatically load the "shared secret" memory location with a copy of the device serial number. This needs to occur in the event that the unit is reset in the field.

Once the security keys have been established, data can be encrypted and transmitted between the remote device and the crypto server with a high degree of security as illustrated in FIGS. 5A and 5B.

Referring to FIG. 5A, a message can be encrypted and transmitted from the remote device 120 to the data center 140 using the above-noted ReFLEX protocols. In preparing the message for transmission, the symmetric key, the device IV and the IV offset is used to encrypt data in step 520. A known encryption algorithm is employed to encrypt the data to be transmitted. For example, a standard Advanced Encryption Standard (AES) algorithm in CTR mode can be used for over-the-air encryption. The specific protocol for the secured messaging can be found, for example, in the Paging Technical Committee (PTC) Engineering Standards and Publications document RFC 30, that discloses how AES should be implemented in a ReFLEX™ network. RFC 30 is hereby incorporated by reference in its entirety.

The message that includes the encrypted data, as well as the IV offset is transmitted in step 535 to the crypto server 240. As illustrated in FIG. 5C, an exemplary message structure for an encrypted message 522 sent between remote device 120 and crypto server 240 is depicted. The message includes a header comprising, for example, a UAR SIF and an identification of the type of encryption algorithm to be employed. Additionally, the message includes the key index value and IV offset value.

When the transmitted message is received at the data center 140 in step 525, the system checks to see if communications with this device are encrypted. If the message is encrypted, the message is forwarded to the crypto server 240 for decoding. When the crypto server 240 receives the message, it calculates the message IV using the device IV and the IV offset sent in the message. The server then uses the message IV and the stored ephemeral symmetric key for decryption. The crypto server 240 then sends the clear text message back to the data center 140 for delivery in step 555.

FIG. 5B, is a block diagram that depicts the encoding and sending a message from crypto server 240 via the data center 140 destined for the remote device 120 (via the forward channel). In step 560, the crypto server 240 receives a message to be encrypted and sent to remote device 120. The crypto server 240 obtains the symmetric key for the remote device and encrypts the message with that key as well as the server IV and IV offset in step 565. The message, depicted in FIG. 5C is then sent to the data center 140 for normal delivery via the ReFLEX™ network in step 570. Once the remote device 120 receives the message in step 575, it decrypts it using the same agreed upon ephemeral symmetric key, server IV and IV offset, in step 580 and then uses the message accordingly.

Figure 6A:
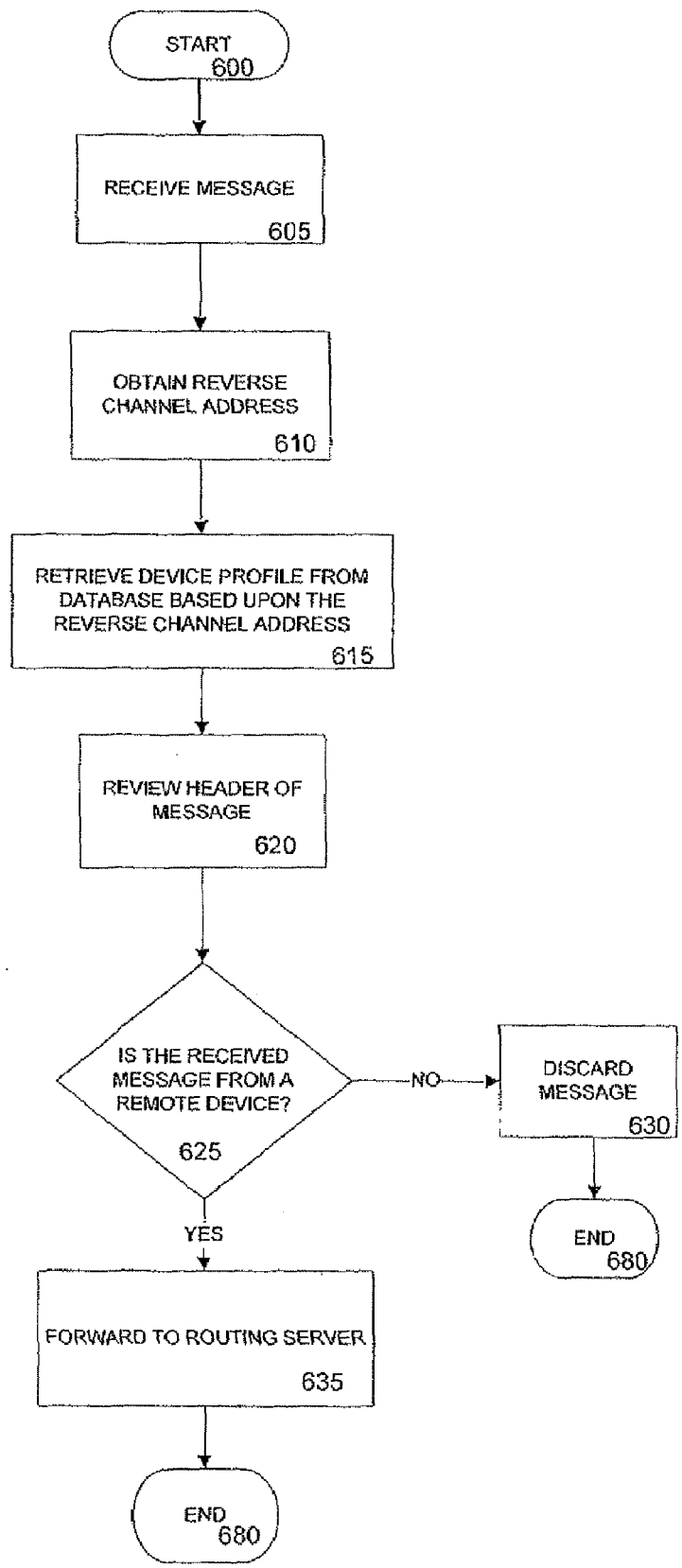
FIGS. 6A and 6B illustrate flow diagrams depicting secure message reception and routing in accordance with exemplary embodiments of the present invention.

FIG. 6A presents a flow diagram that depicts the processing of a message by the RF controller 215 located in the messaging server 210 prior to being routed to the crypto server 240, in accordance with an exemplary embodiment of the present invention. As discussed briefly with respect to FIG. 3, the present invention enables transmission of the secured message via the air medium without exposing the destination address of the message.

The process begins in step 600 and, in step 605, the RF controller 215 receives a message. The RF controller, in step 610, obtains the reverse channel address. Based upon the information in the reverse channel address, in step 615, a device profile associated with the device sending the message is retrieved. Next, in step 620, the header of the received message is reviewed to determine the message is a key establishment message or an encrypted message. Based upon this review the RF controller determines, in step 625, if the message is, in fact, a message from one of a remote devices 120 that is allowed access the network 100, then the message is forwarded to the routing server 220 in step 635. If the message is from one of the remote devices 120, messaging server forwards the message to the routing server. Otherwise, if the message is not from one of the remote devices 120, the message is discarded, in step 630 and the process ends in step 680.

Figure 6B:
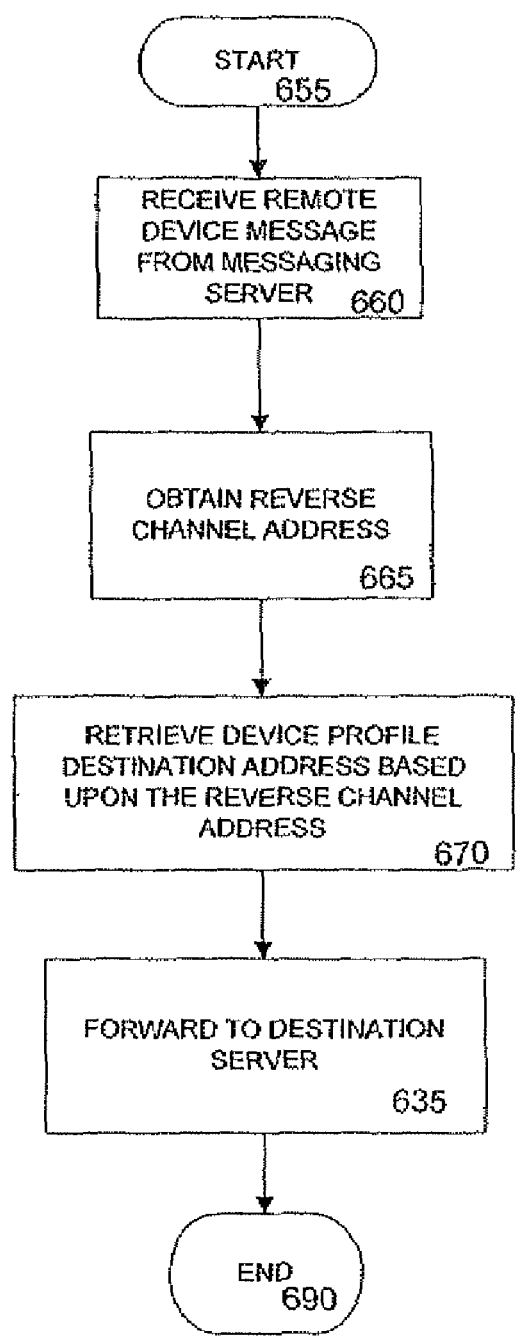

FIG. 6B provides a flow diagram depicting processing that occurs in the routing server 220 when a message is received from the messaging server 210. The process starts in step 655 and in step 660, the message is received. The routing server, in step 665, obtains the reverse channel address. In step 670, the routing server retrieves the device profile and obtains the destination address based on the information in the reverse channel that identifies the remote device 120. In step 675, the routing server forwards the message to a destination (i.e., an appropriate crypto server 240) and the process ends in step 680. Once the message is received at the appropriate crypto server 240, the message is decrypted utilizing the private key, and IV and IV offset as discussed above with respect to FIG. 5 and.

The remote device 120 can be implemented using one or more general purpose computer systems, microprocessors, digital signal processors, micro-controllers, etc., programmed according to the teachings of the embodiments of the present invention (e.g., using the computer system of FIG. 7) Appropriate software implementing the function described above can be readily prepared by programmers of ordinary skill based on the teachings of the present disclosure, as will be appreciated by those skilled in the software art.

Figure 7:
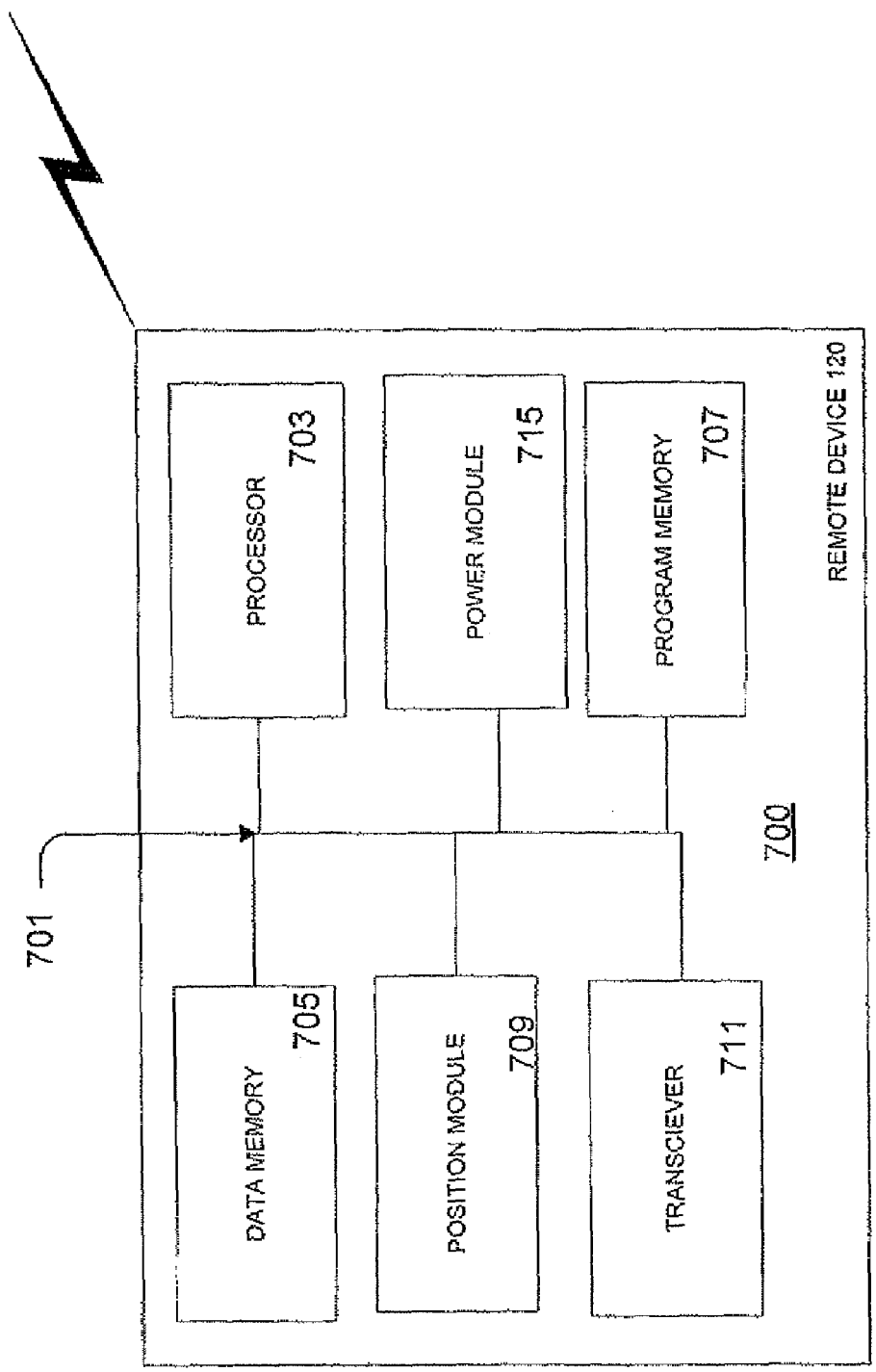
FIG. 7 is a hardware illustration of the remote device in accordance with an exemplary embodiment of the present invention.

FIG. 7 illustrates an exemplary hardware computer system 700 employed within the remote device 120. The computer system 700 can include a bus 701 or other communication mechanism for communicating information, and a processor 703 coupled to the bus 701 for processing the information. The computer system 700 also can include a data memory 705, such as a random access memory (RAM), other dynamic storage devices (e.g., dynamic RAM (DRAM), static RAM (SRAM), synchronous DRAM (SDRAM)), flash memory, etc., coupled to the bus 701 for storing information and instructions to be executed by the processor 703.

In addition, the main memory 705 also can be used for storing temporary variables or other intermediate information during the execution of instructions by the processor 703. The computer system 700 further can include a program memory 707 or other static storage device (e.g., programmable ROM (PROM), erasable PROM (EPROM), electrically erasable PROM (EEPROM), flash memory, etc.) coupled to the bus 701 for storing static information and instructions.

The remote device is able to obtain its position through the use of the position module 709. The position module is able to employ various techniques (e.g., GPS and triangulation) to obtain the position of the remote device 120.

The remote device is also able to communicate with the data center 140 through the use of a transceiver 711. In accordance with exemplary embodiments of the present invention, the transmitter 711 uses a chosen communications protocol to communicate wirelessly with the data center, for example. Such communications protocols include (but are not limited to) ReFLEX™, etc. Since the remote device is a stand alone mechanism, it includes an power module 750 which is able to provide power to the remote device. It should be understood that the power module is capable of receiving power in a variety of configuration, for example, an internal battery or an external power source with an internal back-up battery.

Figure 8:
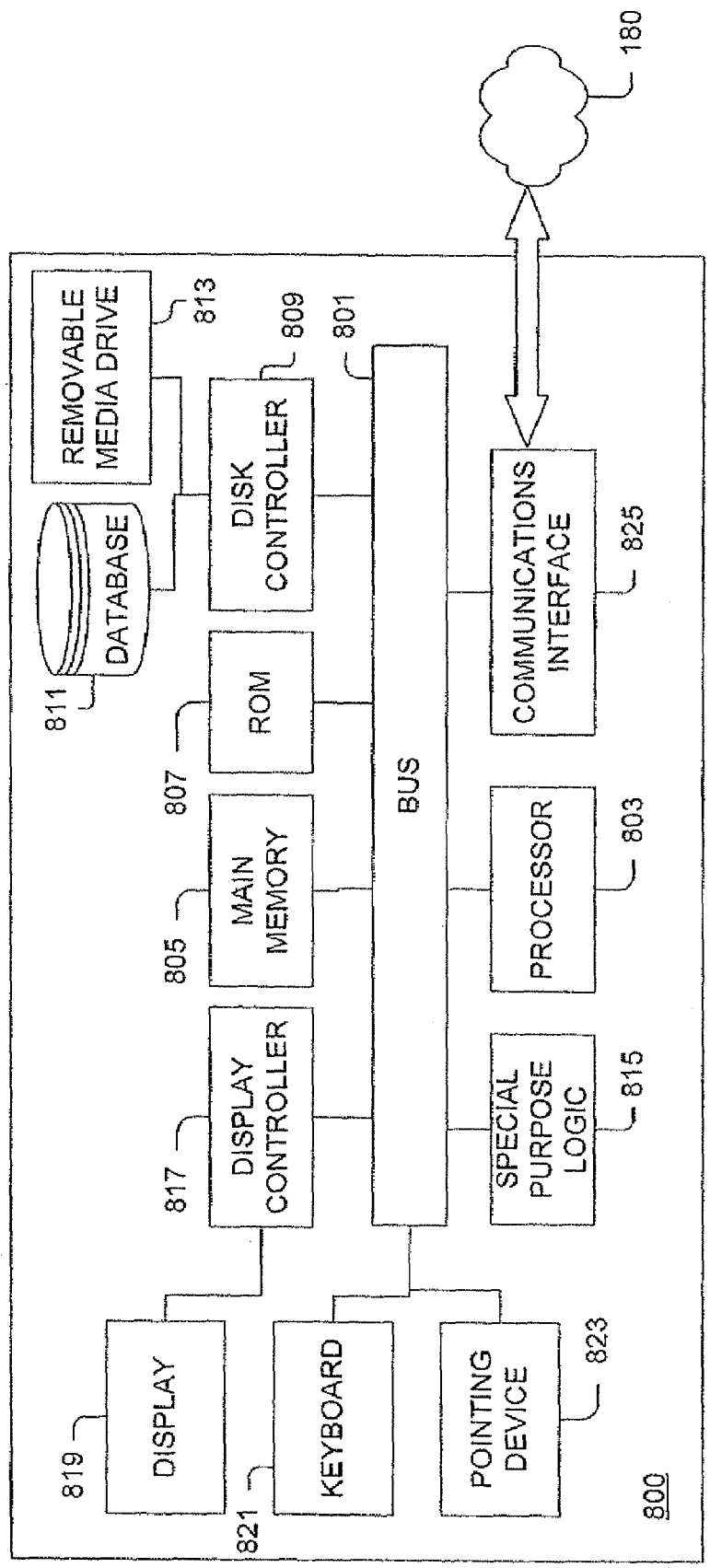
FIG. 8 is a computer system upon which variously described embodiments can be implemented.

FIG. 8 illustrates a computer system 800 upon which the described embodiments of the data center 140 and the client 160 can be implemented. The various embodiments can be implemented on a single such computer system, or a collection of multiple such computer systems. The computer system 700 can include a bus 801 or other communication mechanism for communicating information, and a processor 803 coupled to the bus 801 for processing the information. The computer system 800 also can include a main memory 805, such as a random access memory (RAM), other dynamic storage device (e.g., dynamic RAM (DRAM), static RAM (SRAM), synchronous DRAM (SDRAM)), etc., coupled to the bus 801 for storing information and instructions to be executed by the processor 803.

In addition, the main memory 805 also can be used for storing temporary variables or other intermediate information during the execution of instructions by the processor 803. The computer system 800 further can include a ROM 807 or other static storage device (e.g., programmable ROM (PROM), erasable PROM (EPROM), electrically erasable PROM (EEPROM), etc.) coupled to the bus 801 for storing static information and instructions.

The computer system 800 also can include a disk controller 809 coupled to the bus 801 to control one or more storage devices for storing information and instructions, such as a magnetic hard disk 811, and a removable media drive 813 (e.g., floppy disk drive, read-only compact disc drive, read/write compact disc drive, compact disc jukebox, tape drive, and removable magneto-optical drive). The storage devices can be added to the computer system 800 using an appropriate device interface (e.g., small computer system interface (SCSI), integrated device electronics (IDE), enhanced-IDE (E-IDE), direct memory access (DMA), or ultra-DMA).

The computer system 800 also can include special purpose logic devices 815, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, communications functions, etc.

The computer system 800 also can include a display controller 817 coupled to the bus 801 to control a display 819, such as a cathode ray tube (CRT), liquid crystal display (LCD), active matrix display, plasma display, touch display, etc., for displaying or conveying information to a computer user. The computer system can include input devices, such as a keyboard 821 including alphanumeric and other keys and a pointing device 823, for interacting with a computer user and providing information to the processor 803. The pointing device 823 can include, for example, a mouse, a trackball, a pointing stick, etc., or voice recognition processor, etc., for communicating direction information and command selections to the processor 803 and for controlling cursor movement on the display 819.

The computer system 800 can perform assigned processing steps of the invention in response to the processor 803 executing one or more sequences of one or more instructions contained in a memory, such as the main memory 805. Such instructions can be read into the main memory 805 from another computer readable medium, such as the hard disk 811 or the removable media drive 813. Execution of the arrangement of instructions contained in the main memory 805 causes the processor 803 to perform the process steps described herein. One or more processors in a multi-processing arrangement also can be employed to execute the sequences of instructions contained in the main memory 805. In alternative embodiments, hard-wired circuitry can be used in place of or in combination with software instructions. Thus, embodiments are not limited to any specific combination of hardware circuitry and/or software.

With regard to the systems described in FIGS. 7 and 8, stored on any one or on a combination of computer readable media, the embodiments of the present invention can include software for controlling the computer system, for driving a device or devices for implementing the invention, and for enabling the computer system to interact with a human user. Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

As discussed generally above, with respect to FIG. 1, the computer system 1000 also can include a communication interface 825 coupled to the bus 1001. The communication interface 825 can provide a two-way data communication coupling via a link 180.

The term "computer readable medium" as used herein can refer to any medium that participates in providing instructions to the processor 803 for execution. Such a medium can take many forms, including but not limited to, non-volatile media, volatile media, transmission media, etc. Non-volatile media can include, for example, optical or magnetic disks, magneto-optical disks, etc., such as the hard disk 1011 or the removable media drive 813. Volatile media can include dynamic memory, etc., such as the main memory 805. Transmission media can include coaxial cables, copper wire and fiber optics, including the wires that make up the bus 1001. Transmission media can also take the form of acoustic, optical, or electromagnetic waves, such as those generated during radio frequency (RF) and infrared (IR) data communications.

Various forms of computer-readable media can be involved in providing instructions to a processor for execution. For example, the instructions for carrying out at least part of the embodiments of the present invention can initially be borne on a magnetic disk of a remote computer connected to either of the networks 1029 and 833. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

While the present invention has been described in connection with a number of embodiments and implementations, the present invention is not so limited but rather covers various modifications and equivalent arrangements, which fall within the purview of the appended claims.

Each of the following applications is incorporated by reference in its entirety: co-pending U.S. patent application Ser. No. 10/759,406 filed Jan. 16, 2004, entitled "Method and System for Scheduling of Data Retrieval from Mobile Telemetry Devices"; co-pending U.S. patent application Ser. No. 10/758,770 filed Jan. 16, 2004, entitled "Method and System for Tracking Mobile Telemetry Devices"; co-pending U.S. patent application Ser. No. 10/758,769 filed Jan. 16, 2004, entitled "Method and System for Remotely Configuring Mobile Telemetry Devices"; co-pending U.S. patent application Ser. No. 10/758,768 filed Jan. 16, 2004, entitled "Method and System for Mobile Telemetry Device Prioritized Messaging"; co-pending U.S. patent application Ser. No. 10/758,930 filed Jan. 16, 2004, entitled "Method and System for Interfacing with Mobile Telemetry Devices"; co-pending U.S. patent application Ser. No. 10/759,404 filed Jan. 16, 2004, entitled "Method and System for Transmitting Assistance Location Data for Fleet and Asset Management"; and co-pending U.S. patent application Ser. No. 10/758,213 filed Jan. 16, 2004, entitled "Method and System for Tracked Device Location and Route Adherence via Geofencing", the entireties of which are incorporated herein by reference.

What is claimed is:

1. A method, comprising:
   receiving, via a wireless channel, a packetized message at a network device;
   obtaining, via the network device, a reverse channel address on the wireless channel, the reverse channel address being associated with the packetized message;
   based on the reverse channel address and independent of a content of the packetized message, determining, via the network device, an identity of a remote device associated with the packetized message and a destination address for the packetized message; and
   routing via the network device, the packetized message to the destination address.

2. The method of claim 1, further comprising:
   reviewing the content to determine when the packetized message includes a registration request; and
   when the packetized message includes the registration request, forwarding a response to the remote device to establish key encryption.

3. The method of claim 2, where the key encryption comprises a public/private elliptic curve cryptography key encryption.

4. The method of claim 2, where the response comprises an initiation vector to provide an ephemeral encryption key to the remote device.

5. The method of claim 2, where the registration request is sent by the remote device in response to an initial operation of the remote device.

6. The method of claim 2, where the registration request is sent by the remote device in response to a detected error at the remote device.

7. The method of claim 1, where determining the identity of the remote device and the destination address includes:
   retrieving the identity of the remote device based on the reverse channel address;
   retrieving a stored profile of the remote device based on the identity of the remote device; and
   reviewing the stored profile of the remote device for the destination address.

8. The method of claim 1,
   where the packetized message is encrypted, and
   where determining the identity of the remote device and the destination address is without decrypting the packetized message.

9. An apparatus comprising:
   a processor to:
      obtain a reverse channel address associated with a received message,
      based on the reverse channel address and independent of a content of the received message, determine an identity of a remote device,
      based on the identity of the remote device, retrieve a stored profile of the remote device, where the stored profile includes a destination address for the received message, and
      route the received message to the destination address in the stored profile.

10. The apparatus of claim 9, where the processor is further to:
    review the content of the received message to determine that the received message includes a registration request; and
    when the received message includes the registration request, forward a response to the remote device to establish key encryption.

11. The apparatus of claim 10, where the key encryption comprises a public/private elliptic curve cryptography key encryption.

12. The apparatus of claim 10, where the response comprises an initiation vector to provide an ephemeral encryption key to the remote device.

13. The apparatus of claim 10, where the received message is sent by the remote device in response to an initial operation of the remote device and without user input to the remote device.

14. The apparatus of claim 10, where the message is sent by the remote device in response to a detected error at the remote device.

15. The apparatus of claim 10,
    where the registration request comprises a first registration request,
    where the processor is further to:
       in response to the first registration request, forward an acknowledgment to the remote device, and
       after forwarding the acknowledgment, receive a second registration request from the remote device, and
    where the response is forwarded in reply to receiving the second registration request.

16. A non-transitory computer-readable medium encoded with instructions capable of being executed by a processor in a network device, the instructions comprising:
    one or more instructions for receiving a wireless message at the network device;
    one or more instructions for obtaining a reverse channel address associated with the wireless message;
    one or more instructions for, based on the reverse channel address and independent of a content of the wireless message, determining an identity of a mobile station associated with the wireless message and a destination address for the wireless message; and
    one or more instructions for routing, via the network device, the wireless message to the destination address,
    where the one or more instructions for routing the wireless message includes:
       one or more instructions for reviewing a header of the wireless message to determine when the wireless message includes a registration request, and
       one or more instructions for forwarding, when the wireless message includes the registration request, a response to the mobile station to establish key encryption.

17. The non-transitory computer-readable medium of claim 16,
    where the wireless message includes the registration request,
    where the registration request comprises a first registration request,
    where the instructions for further include:
       one or more instructions for forwarding, in response to the first registration request, an acknowledgment to the mobile station, and
       one or more instructions for receiving, after forwarding the acknowledgment, a second registration request from the mobile station, and
    where the one or more instructions for forwarding the response include:
       one or more instructions for forwarding the response in reply to receiving the second registration request.

18. The non-transitory computer-readable medium of claim 16,
where the wireless message includes the registration request, and
where the key encryption comprises a public/private elliptic curve cryptography (ECC) key encryption.

19. The non-transitory computer-readable medium of claim 16,
where the wireless message includes the registration request,
where the response comprises an initiation vector to provide an ephemeral encryption key to the mobile station, and
where the ephemeral encryption key enables the mobile station to form a symmetric encryption key.

20. The non-transitory computer-readable medium of claim 16,
where the wireless message includes the registration request, and
where the wireless message is sent by the mobile station in response to an initial operation of the mobile station.

* * * * *